(12) United States Patent
Hartung

(10) Patent No.: US 6,434,884 B1
(45) Date of Patent: Aug. 20, 2002

(54) STABLE ORGANIC BIOSTIMULANT USEFUL IN AGRICULTURAL, HORTICULTURE AND MICROBIAL PROCESSES AND METHODS OF PRODUCING SAME

(75) Inventor: Harold A. Hartung, West Collingswood, NJ (US)

(73) Assignee: Certified International Trading Co., Inc., Mt. Laurel, NJ (US)

( * ) Notice: Subject to any disclaimer, the term of this patent is extended or adjusted under 35 U.S.C. 154(b) by 0 days.

(21) Appl. No.: 09/417,789

(22) Filed: Oct. 14, 1999

(51) Int. Cl.⁷ ............................. C05F 11/02; A01C 3/00
(52) U.S. Cl. .................. 47/58.1; 47/59; 71/24
(58) Field of Search .................. 47/59, 58.1; 71/11, 71/23, 24

(56) References Cited

U.S. PATENT DOCUMENTS

| | | | |
|---|---|---|---|
| 3,967,953 A | 7/1976 | MacMurray | 71/97 |
| 3,989,498 A | 11/1976 | Cox | 71/3 |
| 4,012,220 A | 3/1977 | Szalay et al. | 71/11 |
| 4,084,938 A * | 4/1978 | Willard, Sr. | 424/125 |
| 4,333,758 A | 6/1982 | Welebir | 71/80 |
| 4,459,149 A | 7/1984 | Moran et al. | 71/24 |
| 5,019,267 A | 5/1991 | Eberhard et al. | 210/606 |
| 5,466,273 A | 11/1995 | Connell | 71/11 |
| 5,516,486 A | 5/1996 | Wright et al. | 422/28 |
| 5,538,530 A * | 7/1996 | Heaton et al. | 71/24 |
| 5,676,727 A * | 10/1997 | Radlein et al. | 71/12 |
| 5,984,992 A * | 11/1999 | Greer et al. | 71/11 |
| 6,165,245 A * | 12/2000 | Yamashita | 71/26 |

* cited by examiner

Primary Examiner—Peter M. Poon
Assistant Examiner—Son T. Nguyen
(74) Attorney, Agent, or Firm—Howson and Howson

(57) ABSTRACT

A biostimulating substance, useful in agriculture, horticulture and microbial processes, is composed of acetic acid and a fossil humic substance containing solid humins and humic acid. A method for improving the biostimulating properties and stability of dispersions of fossil humic substances containing peat or lignite includes the step of mixing a fossil humic substance with acetic acid in an amount sufficient that the resulting suspension contains at least about 5 to about 25% by weight organic solids. The modified humic substance can be used as a biostimulant for enhancing plant growth and health and for increasing digestion of organic solids by microorganisms in sewage plants and similar facilities.

30 Claims, 1 Drawing Sheet

STABLE ORGANIC BIOSTIMULANT USEFUL IN AGRICULTURAL, HORTICULTURE AND MICROBIAL PROCESSES AND METHODS OF PRODUCING SAME

FIELD OF THE INVENTION

The invention relates generally to the field of biostimulants, and more particularly to biostimulants composed of humic substances.

BACKGROUND OF THE INVENTION

Humic substances recovered from fossil materials are widely known to stimulate micro-organisms as well as higher plants and animals. These fossil materials derive originally from peat, which may become carbonized to coal, lignite, leonardite (a naturally oxidized lignite) and similar organic deposits. Humic substances extracted from these fossil materials are much more active as biostimulants than younger soil and aquatic humic substances. However, problems have been encountered in presenting these fossil materials for use as stable solutions and dispersions.

While humic substances can be solubilized at high pH, such solutions are somewhat hazardous to handle, and absorb oxygen, reducing their activity. At intermediate pH, dispersion viscosity increases, causing in some cases the formation of gels which are difficult to handle. Further, mildew problems have been found in this intermediate pH range. At low pH, suspensions are formed which are generally fluid and not very stable. After storage for a short time, sticky bottom sediments are formed which are difficult to re-disperse.

What are needed are methods of providing humic substances in a form which makes them available for use as biostimulants and overcomes the problems associated with physical, chemical and biological container stability problems.

SUMMARY OF THE INVENTION

The present invention provides methods of stabilizing humic substances and compositions which are characterized by improved stability on storage, resistance to mildew, and improved bioactivity.

In a first aspect, the present invention provides a stable biostimulant containing acetic acid and a fossil humic substance comprising solid humins and humic acid, wherein the composition contains 5% to about 25%, by weight, organic solids. In one desirable embodiment, the biostimulant composition has a weight ratio of acetic acid to peat humic substance of about 0.08. In another desirable embodiment, the biostimulant composition has a weight ratio of acetic acid to lignite humic substance of about 0.10.

In another aspect, the invention provides a method of stabilizing and increasing the activity of a humic substance. The method involves the steps of mixing fossil humic substances with acetic acid in an amount sufficient that the resulting suspension contains about 5 to about 25% by weight organic solids, wherein the resulting mixture contains about 0.01 to 0.3 parts acetic acid to about 1 part humic substance.

In yet another aspect, the invention provides a method of stimulating plant growth by contacting a plant with a composition comprising a stable biostimulant of the invention.

In still a further aspect, the invention provides a method of stimulating digestion by micro-organisms through addition of a biostimulant of the invention to a substrate to be digested.

These and other advantages of the invention will be readily apparent from the detailed description of the invention.

DETAILED DESCRIPTION OF THE INVENTION

Figure 1:
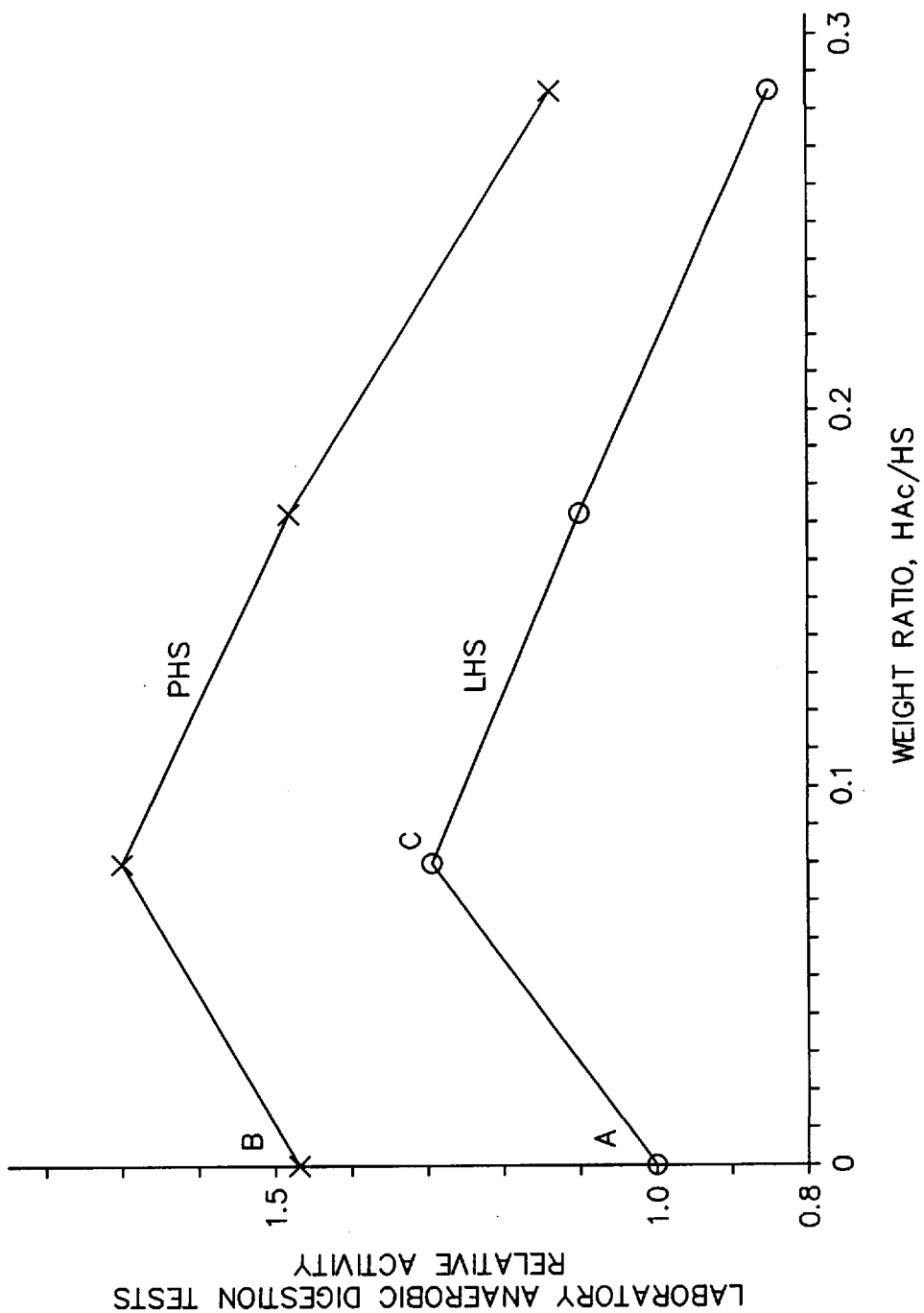
FIG. 1 is a line graph charting the relative activity of LHS (A) and PHS (B) versus the weight ratio of acetic acid to humic substance.

The present invention provides a method for improving the biostimulating properties and stability of dispersions of fossil humic substances. Also provided are biostimulating substances composed of acetic acid and fossil humic substances. The compositions of the invention have improved stability in their containers so that they are more readily presented to those to whom biostimulation is important: agriculturists, horticulturists, sewage treatment professionals and others in the waste-remediation industry, and consumers in these fields. This group of consumers includes homeowners with gardens, lawns and other plantings, and those who operate septic systems; also included are entities who use and maintain grease traps, collection tanks, sewage pumping stations, etc. Further, the present invention is advantageous in that it is suitable for use in organic farming.

As defined herein, the phrase "humic substance" encompasses the acid-insoluble, alkali-soluble organic fraction which may be recovered from anaerobically decomposed organic matter. Such organic matter is formed on the floors of forests from decomposed leaves and other detritus, in soils where agricultural residues are plowed under, on the bottom of ponds and lakes from organic matter that grows therein or falls in; it occurs in peat bogs, in lignite deposits, in coal and many other types of minerals and solids, such as leonardite and aguja. Most commonly, this recovery is performed with alkali. For carbonized materials like coal and lignite, the extraction yield increases greatly if the material is first oxidized. If the resulting solution is acidified to pH 2–3, some of the organic matter precipitates, this material is called humic acid, and the portion which remains in solution is called fulvic acid. Humic substance, therefore, generally contains both humic and fulvic acids. The former are more complex aggregates, with molecular weights commonly in excess of 1000; the latter have lower molecular weights, of the order of several hundred. Among the currently preferred fossil humic substances are included leonardite humic substance (LHS) and peat humic substance (PHS), both of which contain humic acid, free or as a salt, which can be solubilized by alkali or freed by low-pH extraction for recovery as a fine suspension. Other fossil sources, including a broad range of coals and lignites, formed by geological carbonization of the parent peat, need to be oxidized before appreciable recovery of humic substance can be achieved. This oxidation re-establishes acidic structures in the carbonized matrix so that alkaline extraction of solubilized material can be effective. Such oxidized materials can also be treated at low pH to recover humic substance as a fine dispersion. The invention is not limited to the source(s) of the humic substance.

As defined herein, "biostimulating" or "biostimulant" refers to the ability of the compositions of the invention to enhance the growth and/or health of a selected plant, bacteria, or other living organism. Biostimulant also refers to the ability of the compositions of the invention to stimulate digestion by micro-organisms, and particularly, the anaerobic digestion of organic materials.

As used herein, the term "acetic acid" refers to the compound $CH_3COOH$, which may be derived from synthetic or natural sources. For use in organic farming and other organic uses, the acetic acid must be derived from a natural fermentation process, i.e., vinegar. Acetic acid is used in an amount sufficient to bring the biostimulant of the invention to a low pH (around 4–5), where it has been found to be mildew resistant and free of gel structures, while preventing the separation of sticky sediments. Suitably, acetic acid is in a solution which contains at least about 85% acetic acid, and preferably at least 90%, and most preferably, at least 95%, acetic acid, (by volume) in water. However, acetic acid of any concentration can be used as long as it is stoichiometrically possible to satisfy the pH and ratio requirements stated herein. Optionally, salts of acetic acid may be substituted but are typically avoided as such salts make achieving the low pH desired difficult.

The methods of the invention, which involve the use of acetic acid in the amounts provided herein to stabilize and improve the activity of fossil humic substances provide significant advantages. In one embodiment, the method of the invention uses acetic acid for pH control in the dewatering of humus raw materials. In another embodiment, the method of the invention involves mixing acetic acid and a humic substance (which results from a separate dewatering process). Most preferably, in either embodiment, the method of the invention involves mixing acetic acid in an amount sufficient that the resulting suspension of humic substance contains about 5 to about 25% by weight organic solids, about 10% to about 20%, about 12% to about 17%, or about 15%, by weight organic solids. The resulting mixture contains about 0.01 to 0.3 parts acetic acid to about 1 part humic substance by weight. To establish the ratio of acetic acid of humic substance, the suspension to be treated is dried to determine the percentage of total solids by weight. This is done by heating to about 220° F. until the sample dries and constant weight is achieved. The organic fraction of these total solids is determined by ignition of the dried residue, again to constant weight. After burning off the organic material, a residue of ash remains. For the fossil sources described herein, the entire organic portion removed by ignition is considered to be humic substance.

Thus, in one embodiment, the method of the invention involves the use of acetic acid in preparing humic substance for use in organic farming. Generally, the humus raw material is used as it occurs naturally. Thus, the humus raw materials may be peat, a leonardite material, or mixtures thereof. The humus materials are mixed with enough water to form a fluid slurry, the mixture being maintained at or near its isolectric point, which is generally below about pH 3, by the addition of acetic acid to the process water in the amounts described herein. Free humic acid present in the source disperses readily as fine material in the process water, and humic acid which is present in the source material as metallic salts which are only sparingly soluble is freed and also disperses in very fine form. The resulting slurry is then screened to remove coarse particles, which may be sticks, stones, fibers, undecomposed vegetation, and the like, depending upon the source of the raw material. If the quantity warrants, screen tailings may be washed with more process water to improve yield. The screened slurry may, if the nature of the source so indicates, be settled briefly to allow heavy mineral fines, such as soil particles if present in substantial quantity, to fall out. The supernatant slurry of organic materials is then drawn off and filtered. The temperature of the mixture of humus raw material and water is not critical, and ambient conditions provide satisfactory results. However, if the supernatant slurry of organic material is at somewhat elevated temperatures on the order of 100° to 150° F., the solids content of the filter cake is somewhat increased.

The slurry under these conditions filters rapidly under vacuum to a relatively dry cake, generally comprising 20% or more by weight of solids. The filtrate is returned to process water storage for treating further charges. The filter cake may be dried at this point to yield a humic acid of about 85% purity. Drying may be accomplished by any convenient manner. The product may be converted to soluble humate salts by adding a solubilizing agent such as sodium hydroxide, or another suitable solvent, separating residual insolubles and drying the concentrated solution. Most suitably, the moist filter cake is converted to a more dilute fluid suspension, for ultimate use as a liquid product.

The method of the invention may be readily used with other processes for preparing humic substances. Such methods are described in U.S. Pat. No. 4,459,149, and the documents cited therein.

In another embodiment, the method of the invention involves mixing acetic acid with a humic substance, which was previously prepared and is in the form of a filter cake or a suspension. Such a suspension may be prepared by dispersing a cake of a humic substance material, prepared by a low-pH recovery method in water.

According to the present invention, the ratio of acetic acid to humic substance may be readily adjusted by one of skill in the art, depending upon the composition of the humic substance, and within the guidelines provided herein. Preferably, where the humic substance is a peat humic substance (PHS), the weight ratio of acetic acid to PHS is about 0.01 to 0.09, and most preferably about 0.08 parts acetic acid to 1 part PHS. Where the humic substance is a leonardite humic substance (LHS), or lignite, the weight ratio of acetic acid to LHS is about 0.09 to about 0.3, and most preferably about 0.10.

The treatment of a PHS or LHS slurry using acetic acid according to the present invention provides a composition which may be in the form of a cake, which contains acetic acid and LHS or PHS in the amounts set forth above.

Suitably, this cake has an organic solids content in the range of at least about 20%, and more preferably at least about 30%, by weight. Desirably, the cake has a moisture content in the range of less than about 80%, and preferably, less than about 70 to about 75%, by weight.

Thus, in one embodiment, the method of the invention provides a stable biostimulant composition useful in agriculture, horticulture and organic farming for stimulating plant growth and enhancing the health of the plant. The compositions of the invention have also been found to have enhanced bioactivity, as compared to PHS and LHS prepared according to prior art methods.

When used as a biostimulant, the compositions of the invention are dispersed in water to a concentration of 15 parts per million (ppm) to about 200 ppm, and more preferably, to a concentration of about 25 to about 100 ppm, and most preferably to a concentration of about 50 ppm. These concentrations may be optimized depending upon the specific application for which they are being used. For example, for soaking seeds, concentrations as low as 15 ppm are used; in transplant water, 25 ppm is recommended. On sod, turf and most foliar applications, the suspensions are 50–100 ppm in concentration. The biostimulant may be added by any suitable means, including foliar, irrigation and soil. It is applied according to crop-specific recommendations which will depend upon the application method, time of application, and rate of application. All crops are reported to benefit from fossil humic substance biostimulants including, but are not limited to, fruit, nuts, citrus, watermelon, tomatoes, peppers, cucumbers, field and row crops such as cotton, corn, wheat, and rye, as well as other edible, commercial and ornamental plants.

In another embodiment, the method of the invention stimulates digestion of organic matter in soil, in aerobic sewage digesters, and particularly, in anaerobic digesters in sewage treatment plants. This method involves adding about 0.1 to about 1 part by weight of active biostimulant composition of the invention to each 1000 parts by weight of a substrate. [H. A. Hartung, 1990, "Anaerobic Digester Stimulation", Proceedings Int. Conf. On Peat Production and Use, Jyvaskyla, Finland, p. 138–147].

As an example, a small-scale digestion program was run to evaluate the relative activities of the compositions of the invention, containing PHS or LHS treated with HAc in varying amounts. Example 2 describes the procedure and FIG. 1 shows the results, expressed in relative activities. It is noteworthy that when PHS and LHS are compared in this laboratory anaerobic digestion test, the same result appears as when they are used in agriculture; further, when PHS and LHS/HAc are compared in the lab, the result is the same as when they are used in a full-scale sewage plant anaerobic digester. This coherence of the data adds appreciably to the validity of these results. These results demonstrate that HAc treatment, besides improving the stability and applicability of the fossil humic substances, definitely increases their biostimulating activity. These advantages are of considerable importance and unexpected nature.

Both PHS and LHS are used in agriculture, and PHS has been described to be about 50% more active than LHS. Thus, to achieve the effects produced by current forms of PHS in agriculture, 50% more LHS is required. Current forms of PHS have also been used to stimulate anaerobic digesters in sewage treatment plants. To find the activity of LHS relative to PHS in this application, it was decided to treat an anaerobic digester with LHS. Because of the system requirements, it was necessary to use LHS/HAc for this test, of the composition of sample B in Example 1. In this field comparison between PHS and LHS/HAc it was expected that the latter would be appreciably less active than PHS, as unmodified LHS is in agriculture. Instead, it was found that it was nearly as active as PHS [within about 10%]. This unexpected increase in activity for LHS treated with Hac was observed over an extended operating period (nearly one year).

This increase in the activity of LHS when prepared according to the invention has been interpreted as an indication that HAc has increased the activity of LHS in the sewage plant application. Further, when PHS is formulated with acetic acid and evaluated for the stimulation of anaerobic digestion, it is found to be more active than without acetic acid compounding, in a manner similar to that observed with LHS. FIG. 1 includes data on the ability of the method of the invention to enhance the activity of PHS. It is apparent that the increase in activity is appreciable.

While not wishing to be bound by the theory of the mechanism by which the present invention works in microorganism simulation, the inventor believes that this result may be due in part to the fact that acetic acid is prominent in the sequence of compounds leading to the formation of methane in anaerobic digesters. Thus, while the amount of acetic acid used in the present invention is very small, it may stimulate methane-formers in the complex chain and thus the overall system. Acetic acid is preferred over propionic acid for use in the present invention; although, under certain circumstances propionic acid may be substituted and/or mixed with the acetic acid for use in the invention. Further, the increased response of seeds and plants to the compositions of the invention suggests that acetic acid enhances the activity of humic substance by other means, such as preventing agglomeration, thus increasing surface area for reaction and preventing inactivation by soil cations. These effects are known to inactivate humic substances in other circumstances.

Additionally, the compositions and methods of the invention further provide advantages in safety, handling, and stability of the humic substances described herein. Particularly, the method of the invention reduces the pH of typically alkaline extracts of LHS to 7 or below, providing safety in handling and eliminating oxygen uptake. Further, the resulting suspensions are fluid (see Example 1). In contrast, prior art mixtures with mineral acid are viscous and in some cases gelled. Further, when the method of the invention is applied to PHS which has been recovered from peat by a low-pH process (e.g., U.S. Pat. No. 4,459,149), the suspension is stabilized to eliminate the formation of bottom sediments. See Table I.

TABLE I

Stability of PHS Dispersions with Acetic Acid (HAC)

| 10% Active PHS Ratio of HAC/PHS | 4.6 pH Stability |
|---|---|
| 0 | Fluid - separation in days |
| 0.0787 | Viscous - no separation in months |
| 0.255 | Fluid - no separation in months |

Current formulations of PHS have long been plagued with container stability problems which have affected its usefulness. At low pH, around 4.5 or below, separation of a heavy, sticky bottom layer occurs; under some conditions separation may be so severe that a clear water layer exists on top. At higher pH, 5.5–7, the viscosity increases and separation is less severe, although it still persists. Alkaline pH's, above 7, improve stability but are avoided because of the oxygen uptake they engender. The methods and compositions of the invention overcome these problems. Particularly, the method of the invention stabilizes PHS at a pH of about 4.5. Here again, the result is a product whose marketability is greatly improved. Despite the fact that previous formulations of PHS at a pH of about 4.5 have been found to lead to hydrogen sulfide ($H_2S$) formation in the container, the formulation of the present invention in the range of this pH has been found to inhibit both mildew and $H_2S$ emanation problems.

Thus, the advantages of the methods and compositions of the invention in terms of improved stability and bioactivity, as compared to conventional formulations, are readily apparent.

The following examples are provided to illustrate the invention and do not limit the scope thereof. One skilled in the art will appreciate that although specific reagents and conditions are outlined in the following examples, modifications can be made which are meant to be encompassed by the spirit and scope of the invention.

EXAMPLE 1

Acidification of K-LHS

Solutions/suspensions of the potassium salt of leonardite humic substance [K-LHS] were made at 15% organic [LHS] content and various amounts of acetic acid [Hac].

TABLE II

| Sample | HAc, #/gal | HAc/LHS, #/# | pH | Condition |
|---|---|---|---|---|
| A | 0 | 0 | 9.46 | Thick, gelatinous |
| B | 0.1025 | 0.075 | 6.98 | Fluid, hvy. settle |
| C | 0.164 | 0.12 | 5.95 | Fluid, mod. settle |
| D | 0.205 | 0.15 | 5.54 | Fluid, lt. settle |

These treated systems all appeared to be physically suitable for use in an anaerobic digester; sample B was chosen for plant testing. It proved to be a bit too concentrated for this purpose, so the product was diluted to 10% organic. This concentration was satisfactory, handling with ease.

Samples C and D above were adjusted to pH 7 with ammonia; with respect to stability, these modified samples were more suitable than C and D themselves, showing smaller and softer deposit layers. However, small-scale digester testing indicated that they were less active than sample B as biostimulants (see Example 2 and FIG. 1).

Parallel preparations using hydrochloric acid to arrive at pH 7–8 were so viscous and gelatinous as to be useless practically. Acetic acid is clearly superior to the mineral acid here.

EXAMPLE 2

Small-Scale Anaerobic Digester Tests

Anaerobic digestion tests have been conducted in pint bottles over the course of many years to evaluate feedstocks, digester conditions, plant additives like polymers and other variables that might affect digestion. The bottles are flexible polyethylene Boston rounds, partially filled with the system under test, squeezed to expel air, capped securely and placed in a constant-temperature oven to digest. As the digestion proceeds, gas is evolved and the bottle regains its shape; gas volume can be read from calibration on the exterior. As required, the bottle can be vented, squeezed and recapped to continue the digestion; during this operation the combustibility of the gas can be checked by venting into a burner flame. Activity is measured by the cumulative gas evolution and it is usual to run many checks and comparisons to a standard known system to permit reliable orientation of any unknown system. Tests run in this fashion have been used for about 15 years to predict the operation of plant digesters and have shown excellent correlation with full-scale plant digesters.

Substrate for conducting these tests is taken from an active plant digester. Bottles are filled about ⅔ full with substrate, squeezed, capped and placed in the oven to complete gas-generating decomposition; when gas production stops, the tests may begin.

For the work reported here, comparing a group of biostimulants, a large batch of substrate was mixed, measured [360 ml] into individual bottles and equilibrated in the oven. To each bottle 5 grams of fresh biomass was added, along with nine drops of dilute solution containing 0.45 mg of test biostimulant. The test material was replenished every other day; the amount chosen corresponds to the usual rate of treatment of plant digesters. Because these materials work by being consumed, they must be replaced every day or two, as they would be in a plant digester with daily feed.

FIG. 1 shows the relative values obtained in this test. Each point represent an average of multiple test results, relative to LHS which is selected as the base point because it has the lowest activity. It is clear the acetic acid treatment increases the activity of these biostimulants. The validity of these comparisons is enhanced by considering points A (LHS) and B (PHS). B is about 50% greater than A, which is what is found in agriculture. Further, B is about 10% greater than C, which is what is found in a plant anaerobic digester. These two correlations indicate that the small-scale test results have real validity.

EXAMPLE 3

Inhibition of Hydrogen Sulfide Generation

The composition of PHS is such that it can support mildew growth at pH values of 5.5 and trace hydrogen sulfide [$H_2S$] evolution at lower pH; LHS is not known to be subject to these annoyances. By formulating PHS to be stable at pH 4.5 or so, the mildew problem is avoided. At this pH, acetic acid is found to inhibit $H_2S$ formation in PHS. Samples of PHS formulations about three months old without acetic acid that exhibited $H_2S$ emanation were located, treated with acetic acid and then re-packaged. After several months of storage, no odor of $H_2S$ could be detected, although untreated samples continued to evolve the gas.

EXAMPLE 4

Dewatering PHS Slurry Made with Acetic Acid for Organic Farming

Conventional production of peat humic substance (PHS) by the low-pH process involves the use of sulfuric acid to reduce pH to the isoelectric point for efficient dewatering. However, this acid disqualifies the resulting product for use in the organic farming industry, according to the Organic Materials Review Institute (OMRI). Humic acid derivatives themselves are permitted, and potassium hydroxide may be used in non-fortifying amounts in the preparation. Acetic acid is allowed for adjusting pH in the manufacture of this product, according to OMRI listing for Crop Production Materials. Consequently, a plant production run was made using the method of U.S. Pat. No. 4,459,149, modified according to the invention as follows.

TABLE III

| | |
|---|---|
| Acetic acid in water | 5% |
| Peat slurry solids | 5% |
| Slurry pH | 2.7 |
| Screening time | 2.5 hr |
| Tailings moisture | 88% |
| Filter time | 3.5 hrs |
| Cake moisture | 71.5% |

These results show that the method of the invention effectively separated the PHS humic substances, although the screening time was about 25% longer (2.5 hrs vs 2.0 hrs) and the tailing moisture was higher (88% vs. 85%) than with sulfuric acid. The filter time was about the same as using the prior art method (sulfuric acid). The resulting cake moisture was 10% higher than using the prior art method (sulfuric acid) (71.5% vs. 65.0%).

EXAMPLE 5

Evaluation of PHS from Example 4

The filter cake produced in Example 4 was converted to Organic Product:

TABLE IV

| | |
|---|---|
| Total solids | 11.91% |
| Organic solids | 10.41% |
| pH | 4.46 |
| HAc/HA ratio, weight | 0.125 |

The stability of this product in a container is excellent, and in every sense it appears to be of superior quality. The ratio of acetic acid is, however, higher than desired, according to FIG. 1, because of the difficulty in dewatering. It was expected that this might reduce the activity of the product somewhat; if so, correction can be made in the plant by reducing the acetic acid concentration at the start and increasing the filtration time.

The Organic Product was examined agronomically to evaluate its activity experimentally. Two methods were used.

One of these methods involved the comparison of organic product on tomato, pepper and eggplant transplants to an unstimulated control, regular PHS treatment without acetic acid modification, and regular PHS with acetic acid modification. All treated plants out-performed the controls by wide margins. Organic Product was at least the equal of the other two, and in the case of tomato plants, it rated best in plant vigor and the number of fruits.

The other method involved the evaluation of the effect of normal single applications of PHS modified with acetic acid according to the present invention on rye grass seed, which is very sensitive to HAc. Previous studies have shown that acetic acid solutions, when used to water seed beds, interfere with seed germination. Tests were run in aluminum foil trays, 6"×3". Seed was applied at 300 mg/tray; Scotts Fertilizer was used at the same rate. PHS formulations of various concentrations were applied in 10 ml of water per tray at planting; subsequent watering was done with tap water only.

TABLE V

SEVEN-DAY GRASS SPROUTING TEST

| Treatment | Concentration, ppm | Sprouts |
|---|---|---|
| None | — | 90 |
| PHS/NoHAc | 25 | 116 |
| " | 100 | 138 |
| PHS/Added HAc | 25 | 144 |
| " | 100 | 135 |
| Organic Product | 25 | 96 |
| " | 100 | 122 |

In this test, it is apparent that the humic products do not inhibit germination; in fact, they stimulated it markedly. All out-perform the control; the Organic Product is about on a par with unmodified PHS, possibly because of its high acetic acid ratio. While performance in this test is not as good as in the other growth tests, the Organic Product is still a definite stimulant, and it meets the standards of OMRI for organic farming.

All publications cited in this specification are incorporated herein by reference herein. While the invention has been described with reference to a particularly preferred embodiment, it will be appreciated that modifications can be made without departing from the spirit of the invention. Such modifications are intended to fall within the scope of the appended claims.

What is claimed is:

1. A stable biostimulant usefull in agriculture, horticulture and microbial processes, comprising;
   (a) acetic acid and
   (b) a fossil humic substance comprising solid humins and humic acid,
      said biostirulant having a weight ratio of acetic acid to humic substance of about 0.01 to about 0.3 parts acetic acid to about 1 part humic substance, a pH of about 4 to about 5, and wherein the biostimulant comprises at least about 5% to about 25%, by weight, organic solids.

2. The stable biostimulant according to claim 1, wherein the solid humins in the humic substance comprise peat.

3. The stable biostimulant according to claim 2, wherein the biostimulant has a weight ratio of acetic acid to peat of about 0.08.

4. The stable biostimulant according to claim 1, wherein the solid humins in the fossil humic substance comprise lignite.

5. The stable biostimulant according to claim 4, wherein the biostimulant has a weight ratio of acetic acid to lignite of about 0.10.

6. The stable biostimulant according to claim 4, wherein the lignite is leonardite.

7. The stable biostimulant according to claim 1, wherein the biostimulant is composed of about 5 to about 30%, by weight, organic solids.

8. A method of stimulating plant growth comprising the step of: contacting a plant with a composition comprising a stable biostimulant according to claim 1.

9. A method of stimulating microbial digestion comprising the step of adding a biostimulant according to claim 1 to a substrate to be digested.

10. The method according to claim 9, wherein the biostimulant is added in an amount of 0.1 to 1 part by weight active biostimulant per 1000 parts by weight substrate.

11. The stable biostimulant according to claim 1, wherein the solid humins in the fossil humic substance comprise oxidized lignite.

12. The stable biostimulant according to claim 1, wherein the acetic acid is in a solution containing at least about 85% acetic acid.

13. The stable biostimulant according to claim 1, wherein the biostimulant has a moisture content in the range of about 70 to about 75%, by weight.

14. The stable biostimulant according to claim 1, wherein the biostimulant comprises about 10% to about 20%, by weight, organic solids.

15. The stable biostimulant according to claim 1, wherein the biostimulant comprises about 12% to about 17%, by weight, organic solids.

16. The stable biostimulant according to claim 1, wherein the biostimulant comprises about 15%, by weight, organic solids.

17. A method of stabilizing and increasing the activity of a humic substance, said method comprising the step of mixing fossil humic substances with acetic acid in an amount sufficient that the resulting mixture contains at least about 5 to about 25% by weight organic solids, wherein the fossil humic substances comprise solid humins and humic acid, and wherein the resulting mixture contains about 0.01 to 0.3 parts acetic acid to about 1 part humic substance to provide the resulting mixture with a pH of about 4 to about 5.

18. The method according to claim 17, wherein the humic substance comprises peat.

19. The method according to claim 18, wherein the resulting mixture has a weight ratio of acetic acid to peat of about 0.08.

20. The method according to claim 17, wherein the fossil humic substance comprises lignite.

21. The method according to claim 20, wherein the resulting mixture has a weight ratio of acetic acid to lignite of about 0.10.

22. The method according to claim 21, wherein the lignite is leonardite.

23. The method according to claim 17, wherein the resulting mixture is composed of about 5 to about 30%, by weight, organic solids.

24. A stable mixture produced according to the method of claim 17.

25. The method according to claim 17, wherein the solid humins in the fossil humic substance comprise oxidized lignite.

26. The method according to claim 17, wherein the acetic acid is in a solution containing at least about 85% acetic acid.

27. The method according to claim 17, wherein the mixture has a moisture content in the range of about 70 to about 75%, by weight.

28. The method according to claim 17, wherein the mixture comprises about 10% to about 20%, by weight, organic solids.

29. The method according to claim 17, wherein the mixture comprises about 12% to about 17%, by weight, organic solids.

30. The method according to claim 17, wherein the mixture comprises about 15%, by weight, organic solids.

* * * * *